(12) United States Patent
Hartley et al.

(10) Patent No.: US 11,573,155 B2
(45) Date of Patent: Feb. 7, 2023

(54) GENERATION OF NITROGEN DIOXIDE FOR USE WITH BURNER-BASED EXHAUST REPLICATION SYSTEM

(71) Applicant: Southwest Research Institute, San Antonio, TX (US)

(72) Inventors: Ryan Hartley, Kerrville, TX (US); Robert T. Henderson, III, San Antonio, TX (US); Cary Henry, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 446 days.

(21) Appl. No.: 16/703,949

(22) Filed: Dec. 5, 2019

(65) Prior Publication Data

US 2021/0172835 A1 Jun. 10, 2021

(51) Int. Cl.
*G01M 15/10* (2006.01)
*B01D 53/94* (2006.01)
*C01B 21/36* (2006.01)
*B01D 53/90* (2006.01)

(52) U.S. Cl.
CPC ........... *G01M 15/102* (2013.01); *B01D 53/90* (2013.01); *B01D 53/9409* (2013.01); *C01B 21/36* (2013.01); *B01D 2251/10* (2013.01)

(58) Field of Classification Search
CPC ...... B01D 53/90; B01D 53/9409; C01B 21/36
See application file for complete search history.

(56) References Cited

U.S. PATENT DOCUMENTS

2010/0043406 A1\* 2/2010 Hirata ................ B01D 53/9422
60/299
2010/0313552 A1\* 12/2010 Hirata ..................... F01N 3/033
60/287

\* cited by examiner

*Primary Examiner* — Anthony Ayala Delgado
(74) *Attorney, Agent, or Firm* — Livingston Law Firm

(57) ABSTRACT

A method of using a burner-based exhaust replication system to generate exhaust that contains nitrogen dioxide ($NO_2$). An example of such as system is a system used to test automotive exhaust aftertreatment devices. A fluid that decomposes to generate $NO_2$ as one of its decomposition products is selected. The fluid is heated thereby generating $NO_2$, with the amount and duration of heating is controlled to result in a desired decomposition extent of $NO_2$ from the fluid. The fluid is then delivered to an exhaust stream of the system.

14 Claims, 5 Drawing Sheets

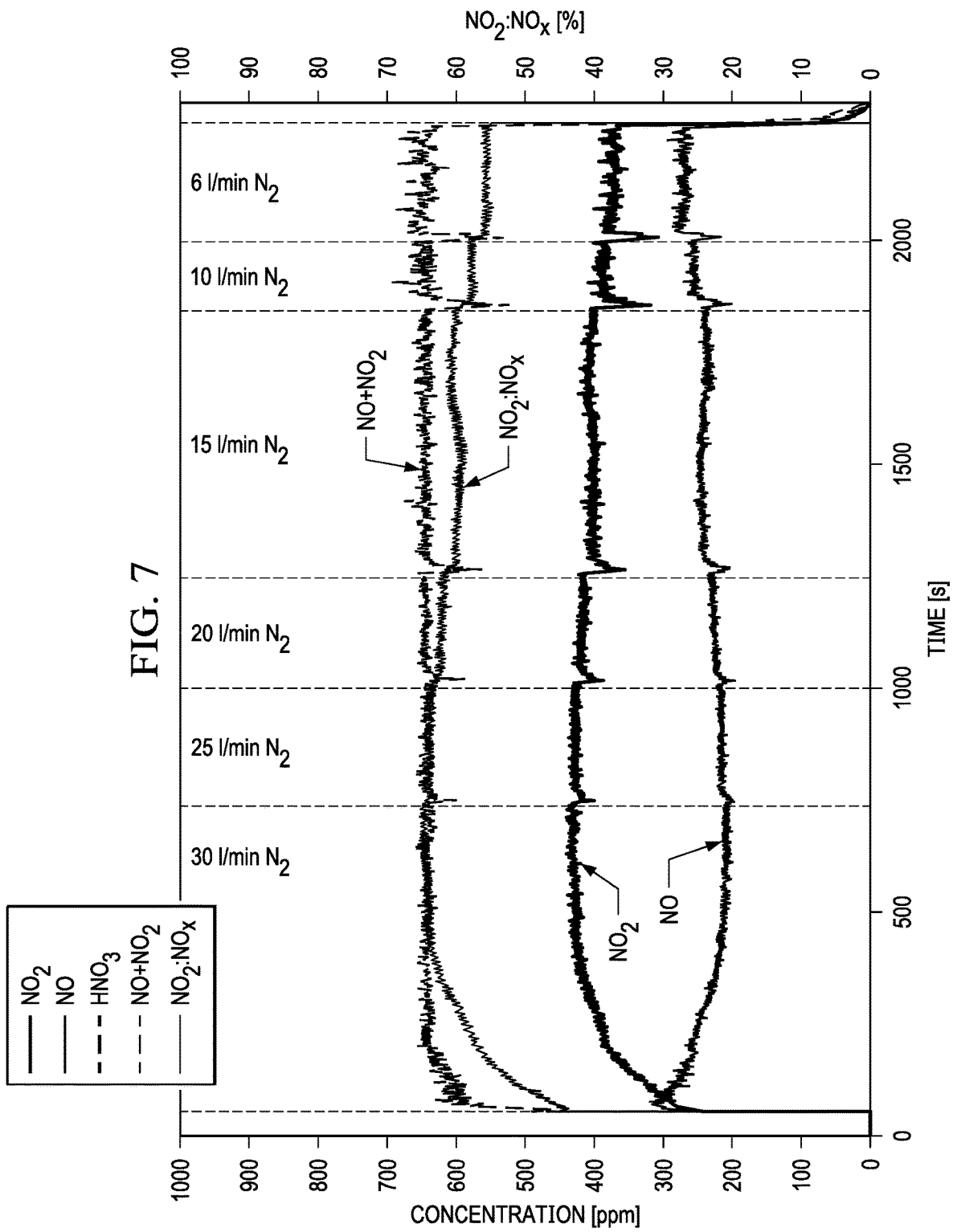

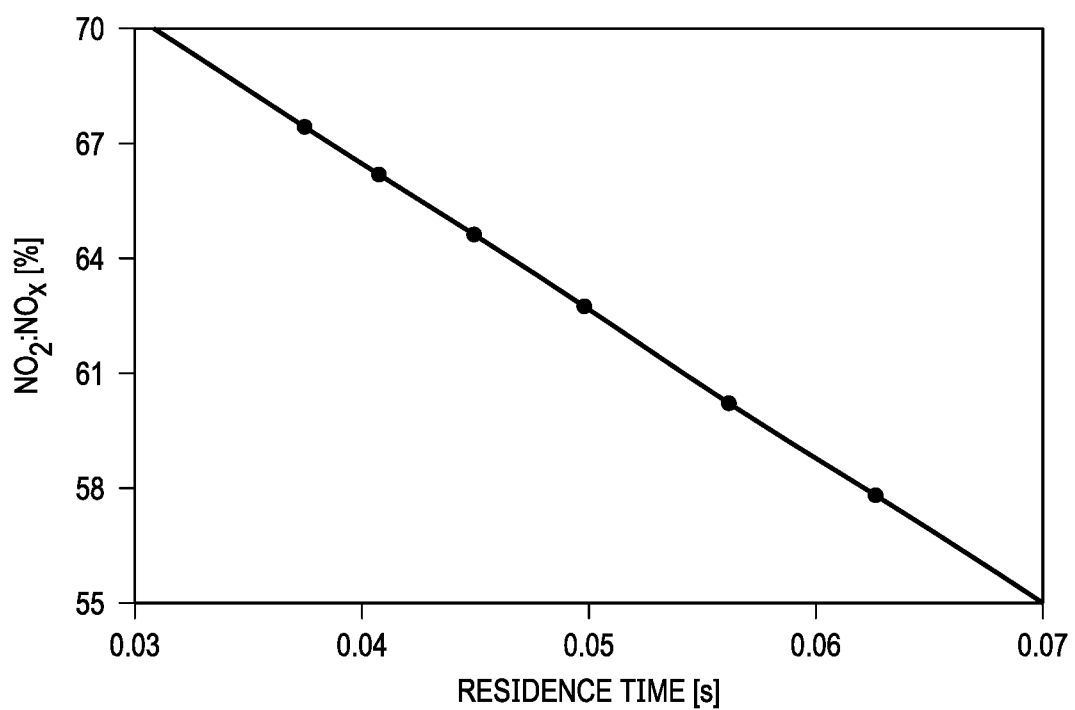

GENERATION OF NITROGEN DIOXIDE FOR USE WITH BURNER-BASED EXHAUST REPLICATION SYSTEM

TECHNICAL FIELD OF THE INVENTION

This invention relates to exhaust replication systems, such as systems for testing automotive exhaust aftertreatment devices, and more particularly to generating nitrogen dioxide for introduction into the exhaust stream produced by such systems.

BACKGROUND OF THE INVENTION

In today's automotive vehicles, exhaust aftertreatment devices remove potentially harmful gases and particulates from the engines' exhaust. Examples of these are the catalytic converters common on gasoline vehicles as well as diesel oxidation catalysts, diesel particulate filters, and selective catalytic reduction catalysts.

The desire for reduced automotive emissions has led to the need for test systems that rapidly and cost-effectively evaluate and age exhaust aftertreatment devices. This allows both performance and durability to be tested.

Conventionally, tests of exhaust aftertreatment devices have been conducted on engine test stands. However, burner-based systems are also used. An example of a burner-based system is the Exhaust Component Transient Operation Laboratory (ECTO-Lab™) developed by Southwest Research Institute.

To test the various exhaust aftertreatment devices in use for today's engine-driven vehicles, a burner-based test system must be capable of replicating the exhaust produced by the engines. Two pollutants of interest are NO (nitric oxide) and $NO_2$ (nitrogen dioxide). Methods exist for generating NO in-situ by combustion of nitromethane/nitroethane, but a method is needed for generation of $NO_2$.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 7 illustrates how the $NO_2$ generation system of FIG. 4 may be used to control $NO_2$ generation by varying the residence time of $HNO_3$ in the decomposition reactor.

FIG. 8 illustrates the $NO_2:NO_x$ ratio produced by the $NO_2$ generation system of FIG. 4 as a function of residence time within the decomposition reactor.

DETAILED DESCRIPTION OF THE INVENTION

The following description is directed to a method for replicating automotive exhaust gas in a burner-based test system. The method produces $NO_2$ (nitrogen dioxide), a gaseous air pollutant composed of nitrogen and oxygen and one of a group of related gases called nitrogen oxides, or NOx.

The method provides for accurate generation and control of $NO_2$ in a burner-based test system. This allows the test system to generate a desired $NO_2:NOx$ ratio within its exhaust stream. Typically, the method is used to generate $NO_2$ for testing automotive exhaust aftertreatment devices, but it could be used for any "exhaust replication system" in which $NO_2$ is needed as a component to replicate engine exhaust.

For purposes of example, the $NO_2$ production method is described in the context of use with a burner-based ECTO-Lab test system. As described in the Background, the ECTO-Lab test system is for aftertreatment testing, accommodating full-sized catalysts from light-duty gasoline engines to large, heavy-duty diesel and natural gas engines. It is a multi-fueled, burner-based system designed to replicate exhaust conditions generated by internal combustion engines. The ECTO-Lab system can simulate lean and stoichiometric exhaust gas conditions using gasoline, diesel, natural gas, or propane fuels. It meets testing requirements for a wide range of full-size aftertreatment catalysts and devices.

However, the invention may be used with any burner-based automotive test system that requires nitrogen dioxide in its exhaust stream.

Figure 1:
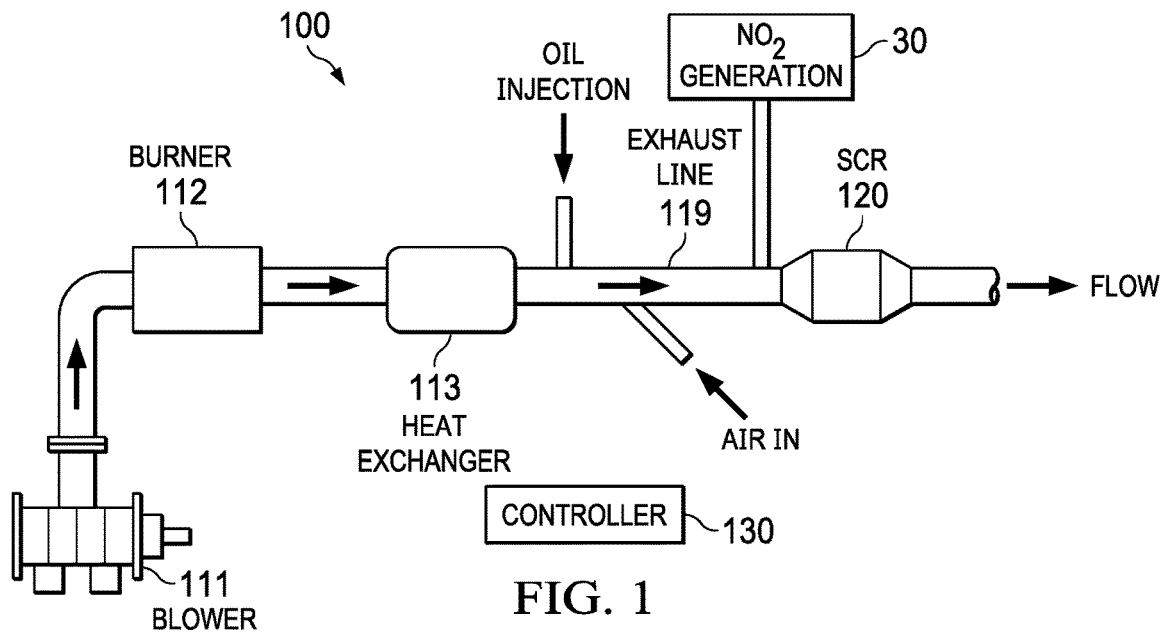
FIG. 1 illustrates a burner-based test system for testing automotive exhaust aftertreatment devices, having an $NO_2$ generation system in accordance with the invention.

FIG. 1 illustrates a burner-based test system suitable for use with the present invention. System 100 is designed to replicate engine exhaust in terms of temperature and flow rate. As described below, system 100 has a $NO_2$ generation system 30, which is capable of providing a desired amount of $NO_2$ into the exhaust stream.

As stated in the Background, an example of such a system is the ECTO-Lab™ system, developed by Southwest Research Institute. Exhaust gas conditions are generated through computer control and allow various combinations of flow, temperature, exhaust component concentrations.

A burner 112 combusts a hydrocarbon fuel, such as gasoline or natural gas, thereby producing an exhaust stream. A wide range of air-fuel ratios may be combusted. A blower 111 is used to produce a desired air flow into burner 112.

A heat exchanger 113 allows the exhaust gas temperature delivered from system 100 to be controlled. A typical range of outlet temperatures for system 100 is 400 to 1200 degrees centigrade.

An exhaust line 119 delivers the exhaust to an exhaust aftertreatment device 120 that is being tested. An oil injector allows oil to injected into the exhaust line 119. This feature of system 100 is significant for aging various aftertreatment devices. A secondary air injector allows an amount of fresh air to be injected into the exhaust line 119.

In the example of this description, device 120 is a selective catalytic reduction (SCR) catalyst. SCR catalyst testing is of particular interest because of the need to achieve a desired $NO_2:NOx$ ratio at the front face of the catalyst to simulate its use in a vehicle.

A controller 130 allows system 100 to implement programmable aging cycles. Parameters affecting the exhaust flow and content, such as exhaust temperature, flow rate, combustion air-fuel ratio, secondary air injection, and oil injection, may be varied. Although not shown in FIG. 1, system 100 has appropriate valves, injectors, and other mechanisms for achieving these controls. Input lines for oil injection and secondary air injection are shown in FIG. 1, although not necessarily used for purposes of $NO_2$ generation.

Controller 130 may incorporate the various control features described below, or those features may be implemented with separate controllers.

Most systems 100 have a modular design, which allows components to be added to the base burner and heat exchanger. The system 100 can be modified as desired to simulate stoichiometric or lean-burn multi-fuel engines, as well as to replicate full transient exhaust traces.

Figure 2:
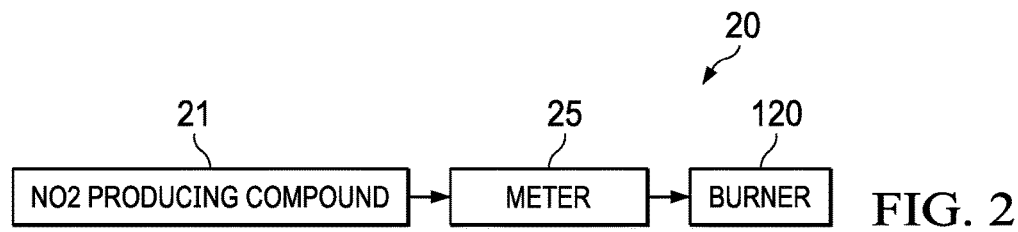
FIG. 2 illustrates a first embodiment of an $NO_2$ generation system for producing $NO_2$ in the exhaust stream of the test system of FIG. 1.

FIG. 2 illustrates a first embodiment of an $NO_2$ generation system for producing $NO_2$ in an exhaust stream of test system 100. In this embodiment, $NO_2$ is produced by combustion of burner 112.

A reservoir 21 contains a fluid that produces $NO_2$ when that fluid combusts. Using meter 25, a desired amount of this fluid is metered into burner 112, where it combusts along with the "normal" burner fuel. The $NO_2$-producing fluid may be injected directly into the combustion zone of the burner.

An example of an $NO_2$-producing fluid is nitric acid. Nitric acid ($HNO_3$) is known to decompose thermally or by light according to the equation $4HNO_3 \rightarrow 2H_2O + 4NO_2 + O_2$. The nitric acid may be used in an aqueous form to reduce any caustic effects on equipment and personnel.

The decomposition extent and products may require precise temperature and O2 control, both of which can be integrated into a closed-loop control scheme of system 100.

Figure 3:
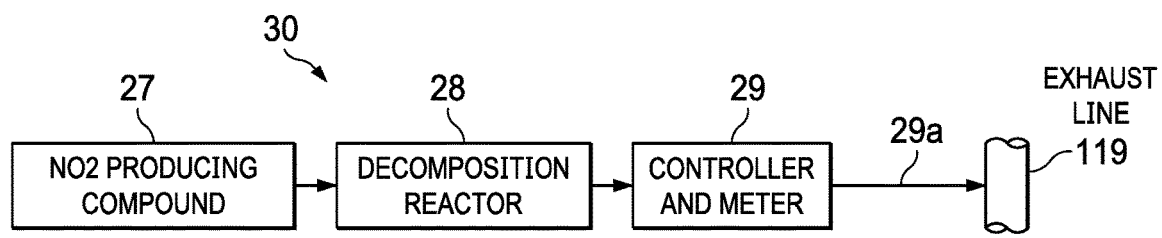
FIG. 3 illustrates a second embodiment of an $NO_2$ generation system for producing $NO_2$ in an exhaust stream of the test system of FIG. 1.

FIG. 3 illustrates a second embodiment of an $NO_2$ generation system 30 for producing $NO_2$ in an exhaust stream of test system 100. In this method, $NO_2$ is produced externally to system 100 and introduced into the exhaust stream of system 100, directly into exhaust line 119.

A reservoir 27 stores an $NO_2$-producing fluid, such as nitric acid. The $NO_2$-producing fluid is delivered to a decomposition reactor 28 where it is heated to a desired temperature for a desired length of time to produce $NO_2$. To increase the reaction rate, a decomposition catalyst, may be used within reactor 28. An inert surface area promoter, such as glass or ceramic Raschig rings, may be additionally or alternatively used.

A controller 29 has a meter, such as a mass flow meter, to meter the flow of gaseous $NO_2$ into the exhaust line 119 of system 100. The controller 29 may be installed on either side of reactor 28. Controller 29 also controls the temperature of the reactor 28. Control of the residence time of the $NO_2$-producing fluid within reactor 28 may be controlled by metering the flow rate into reactor 28 as described below.

The $NO_2$ injection point may be anywhere downstream of burner 112 and upstream the aftertreatment device 120. Typically, the injection point will be a sufficient distance in front of device 120 to ensure mixing and therefore uniformity of $NO_2$ within the exhaust mixture. If desired, the line 29a carrying the $NO_2$ to the exhaust line 119 may be heated.

Figure 4:
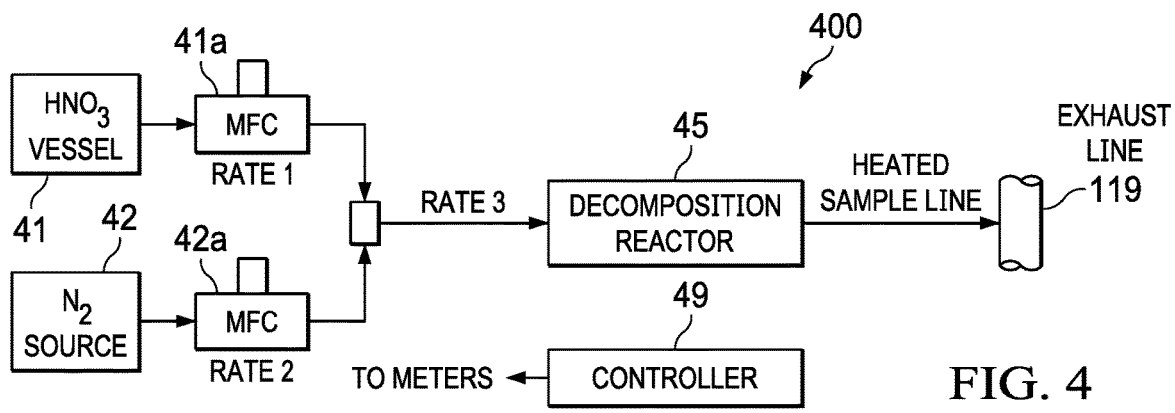
FIG. 4 illustrates a variation of the $NO_2$ generation system of FIG. 3.

FIG. 4 illustrates a variation of the $NO_2$ generation system of FIG. 3. In system 400, $HNO_3$ and nitrogen ($N_2$) are stored in respective reservoirs 41 and 42, respectively. The $N_2$ is used as a carrier gas to help achieve steady and repeatable $NO_2$ formation within decomposition reactor 45.

Carrier gases other than nitrogen may be used, such as ambient air or carbon dioxide. Other suitable carrier gases are any non-radioactive noble gas, such as helium, neon, argon, krypton, and xenon.

Both fluids have an associated meter, such as a mass flow meter, 41a and 42a, which meter the respective fluids to decomposition reactor 45. Reactor 45 comprises a heater and possibly a reduction catalyst and surface area promoter. As with system 30, a controller 49 controls the temperature of reactor 45. It also controls meters 41a and 41b to control the residence time of $HNO_3$ and $N_2$ within the reactor.

Figure 5:
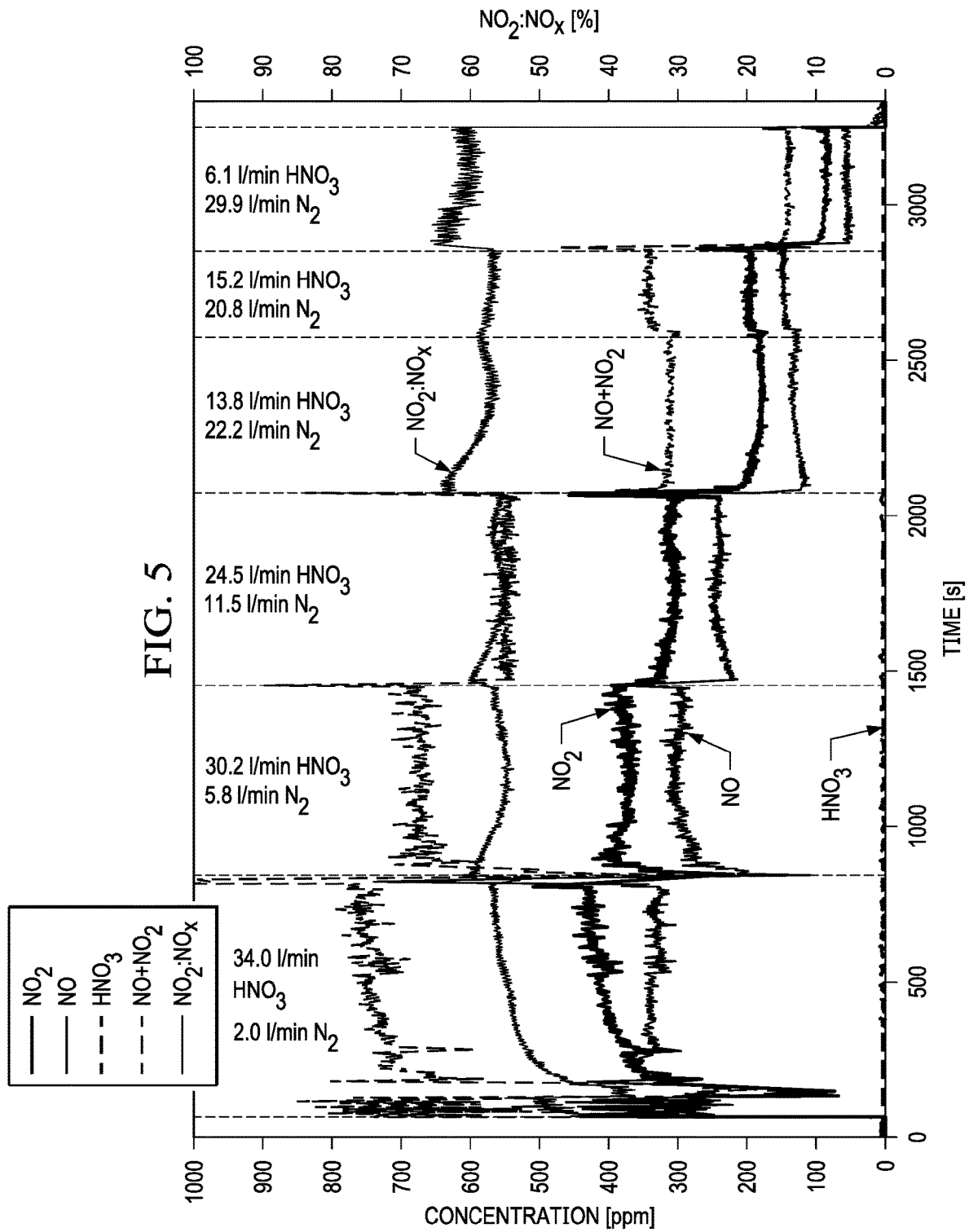
FIGS. 5 and 6 illustrate how the $NO_2$ generation system of FIG. 4 may be used to control $NO_2$ generation by varying the flow rates of $N_2$ and $HNO_3$ into the decomposition reactor.

FIG. 5 illustrates how system 400 may be used to control $NO_2$ generation by varying the flow rates of $N_2$ and $HNO_3$ into reactor 45. Using meters 41a and 42b, the individual flow rates may be varied. In example experimentation, the sum of the $HNO_3$ and $N_2$ flow rates were maintained at a constant value of 36.0 1/min, and the individual flow rates were varied. The decomposition reactor 45 was maintained at a temperature of 550° C. Under these conditions, all nitric acid is decomposed. The flow rate of $HNO_3$ may be varied to obtain a desired concentration of $NO_2$ or a desired $NO_2$:NOx ratio.

Figure 6:
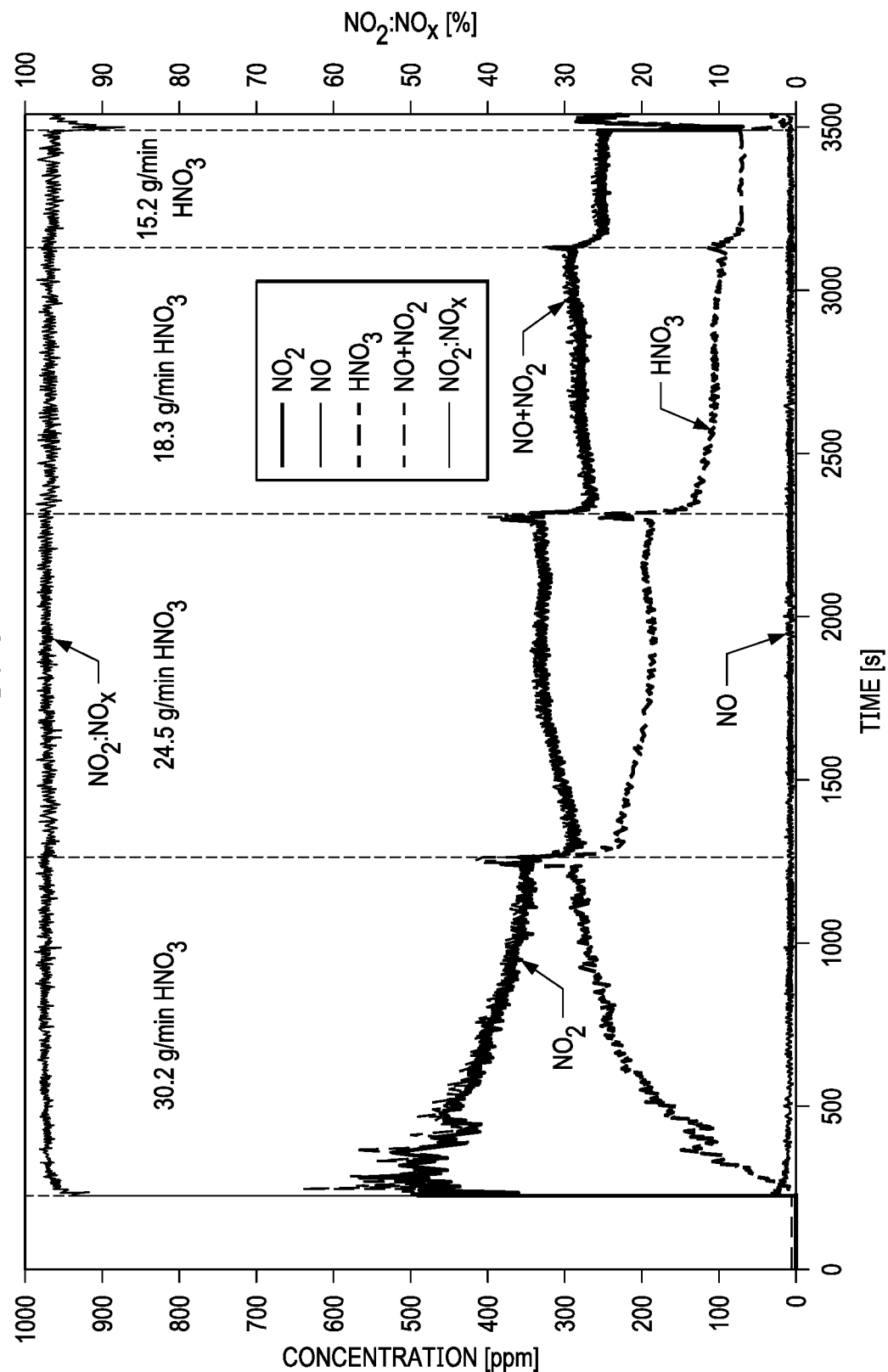

FIG. 6 illustrates how decomposition is affected by lower temperatures of decomposition reactor 45. In the example experiment of FIG. 6, the decomposition reactor 45 was reduced to a temperature of 400° C. As in FIG. 5, a constant total flow of the sum of $HNO_3$ and $N_2$ was maintained at 36.0 1/min, and the $HNO_3$ and $N_2$ flow rates were individually varied. By reducing the temperature of the decomposition reactor 45, the $NO_2$:NOx ratio can be increased to a value of >95%. The $NO_2$ and $NO+NO_2$ plots overlap. At lower temperatures, the $NO_2$:NOx ratio has a larger controllable range into the exhaust stream, although there is also nitric acid slip into the exhaust.

FIG. 7 illustrates how decomposition is affected by the residence time of $HNO_3$ within decomposition reactor 45. In this example experiment, the flow rate of $HNO_3$ was kept constant at 30.2 g/min and the $N_2$ flow rate was progressively increased. The decomposition reactor 45 was maintained at 550° C. By increasing the $N_2$ flow rate in such a manner, the residence time of $HNO_3$ within the decomposition reactor 45 was progressively decreased and the effect on the $NO_2$:$NO_x$ was quantified.

FIG. 8 illustrates the $NO_2$:$NO_x$ ratio produced by the $NO_2$ generation system of FIG. 4 as a function of residence time within decomposition reactor 45. From these data, it is apparent that an increase in residence time of $HNO_3$ within decomposition reactor 45 results in a reduced $NO_2$:$NO_x$ ratio when the decomposition reactor was maintained at 550° C.

The above-described data demonstrate that an appropriate decomposition reactor temperature and $HNO_3$ residence time must be selected if a high $NO_2$:$NO_x$ ratio is to be achieved while mitigating $HNO_3$ breakthrough.

Decomposition of nitric acid to $NO_2$ and its other products may reach completion (100% conversion) at temperatures as low as 200° C. and 1 atm. If nitric acid is given sufficient decomposition time, complete decomposition may be possible at temperatures as low as 120 degrees C.

Using the above-described methods, the test system is capable of achieving a desired $NO_2$:NOx ratio at the front face of an exhaust aftertreatment device, such as an SCR catalyst. No oxidation catalyst is needed. An example of a suitable $NO_2$:NOx ratio for testing an SCR catalyst is 0.5.

What is claimed is:

1. A method of using a burner-based exhaust replication system to generate exhaust that contains nitrogen dioxide ($NO_2$), comprising:

selecting a fluid that decomposes to generate $NO_2$ as one of its decomposition products;

heating the fluid, thereby generating $NO_2$;

wherein the amount and duration of heating is controlled to result in a desired decomposition extent of $NO_2$;

delivering the $NO_2$ to an exhaust stream of the test system; and metering the fluid prior to the heating step, or metering the $NO_2$ delivered to the exhaust stream, to provide a desired amount of $NO_2$ into the exhaust stream.

2. The method of claim 1, wherein the fluid is nitric acid.

3. The method of claim 1, wherein the heating step is performed in a decomposition reactor having a reduction catalyst.

4. The method of claim 1, wherein the delivering step is performed using a heated conduit.

5. The method of claim 1, wherein the desired amount of $NO_2$ is a proportion of a $NO_2$:NOx ratio.

6. The method of claim 1, further comprising using nitrogen as a carrier gas for the fluid.

7. An improved burner-based exhaust replication system, the exhaust replication system having an exhaust line that carries an exhaust stream as output of the test system, the improvements comprising:

a decomposition reactor, operable to receive a fluid that decomposes to generate $NO_2$ as one of its decomposition products and to heat the fluid, thereby generating $NO_2$;

a controller operable to control the amount and duration of heating to result in a desired decomposition extent of $NO_2$;

a conduit for delivering the $NO_2$ from the decomposition reactor to the exhaust stream of the test system; and a meter upstream or downstream the decomposition reactor, operable to provide a desired amount of $NO_2$ into the exhaust stream.

8. The test system of claim 7, wherein an exhaust aftertreatment device is installed on the exhaust line for testing, and wherein the conduit delivers the $NO_2$ upstream the exhaust aftertreatment device.

9. The test system of claim 8, wherein the meter is upstream of the decomposition reactor, and wherein the controller controls the duration of heating by controlling the meter and thereby the residence time of the fluid in the decomposition reactor.

10. The test system of claim 8, wherein the fluid is nitric acid.

11. The test system of claim 8, wherein the decomposition reactor has a reduction catalyst.

12. The test system of claim 8, wherein the conduit is heated.

13. The test system of claim 8, wherein the desired amount of $NO_2$ is a proportion of a $NO_2$:NOx ratio.

14. The test system of claim 8, wherein the decomposition reactor is further operable to receive nitrogen as a carrier gas for the fluid.

* * * * *